June 22, 1965  J. SCHWARTZ  3,190,536
COMBINATION THREADED BOLT AND PACKAGING DEVICE THEREFOR
Filed April 9, 1962  2 Sheets-Sheet 1
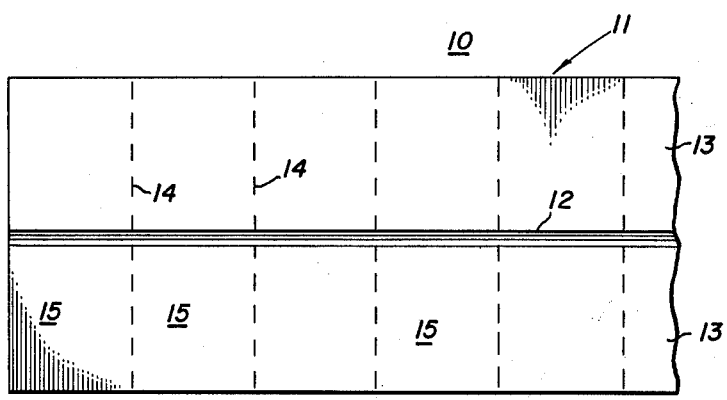
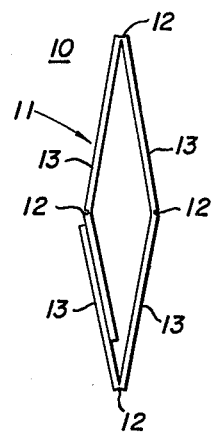
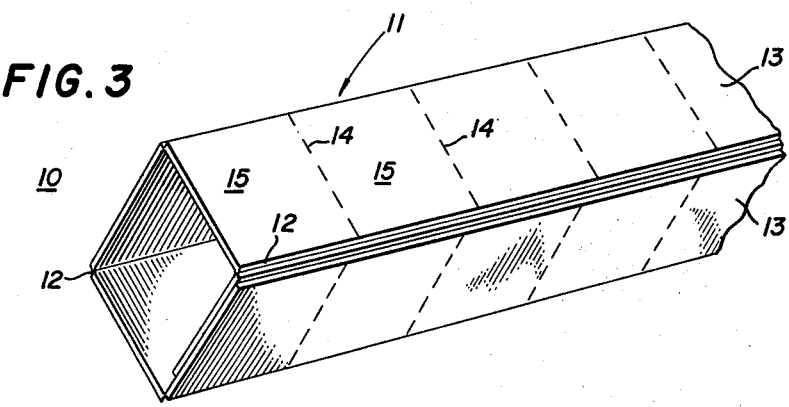
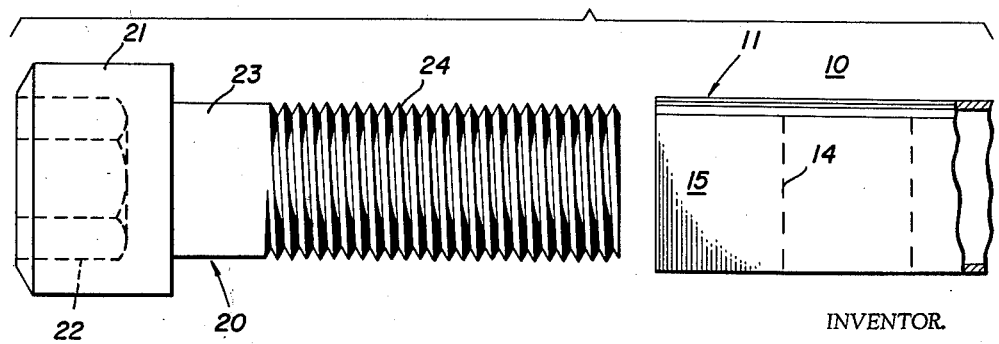
INVENTOR.
JOSEPH SCHWARTZ
BY
ATTYS.

June 22, 1965     J. SCHWARTZ     3,190,536
COMBINATION THREADED BOLT AND PACKAGING DEVICE THEREFOR
Filed April 9, 1962     2 Sheets-Sheet 2
FIG.5
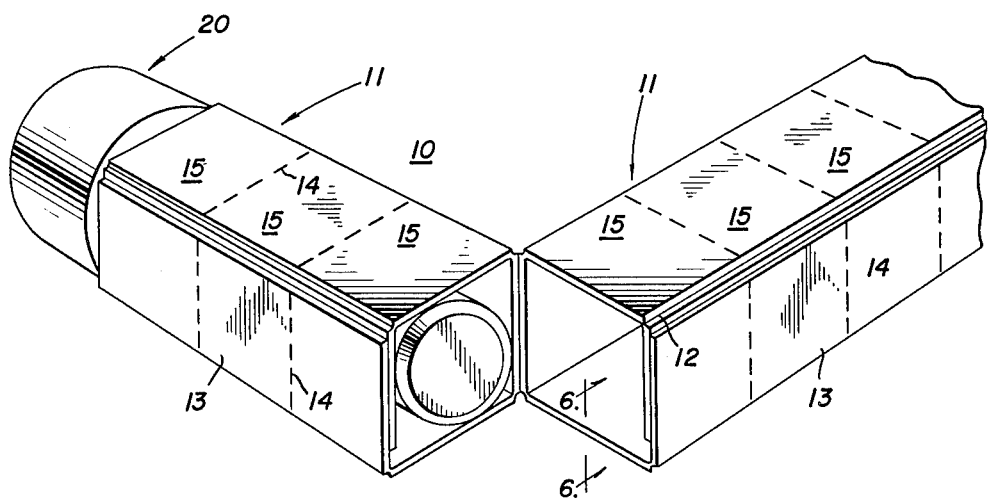
FIG.7
FIG.6
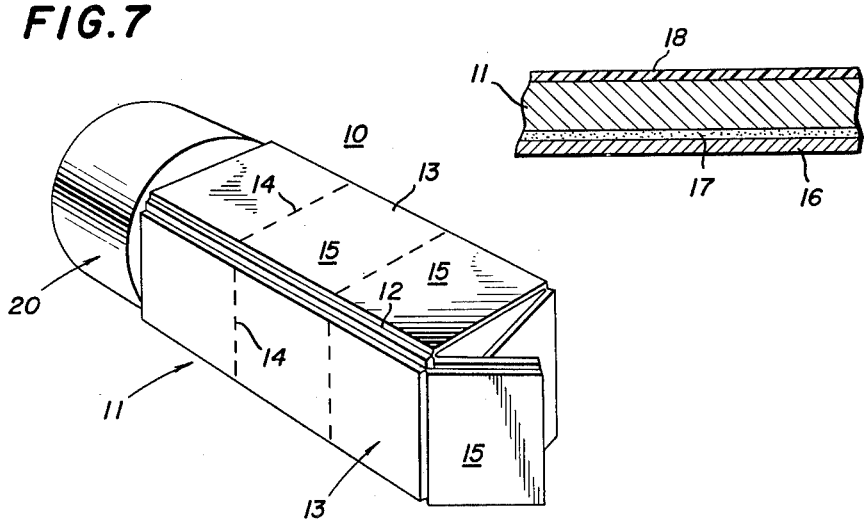
INVENTOR.
JOSEPH SCHWARTZ
BY
Prangley, Baird, Clayton,
Miller & Vogel
ATTYS.

United States Patent Office 3,190,536
Patented June 22, 1965

3,190,536
COMBINATION THREADED BOLT AND
PACKAGING DEVICE THEREFOR
Joseph Schwartz, Fair Lawn, N.J., assignor to General
American Transportation Corporation, Chicago, Ill., a
corporation of New York
Filed Apr. 9, 1962, Ser. No. 185,955
4 Claims. (Cl. 229—40)

The present invention relates to the combination of a threaded bolt and a packaging device therefor, and more particularly to such combination including a packaging device for protecting against damage the external threads carried on the shank of the threaded bolt of relatively large size after manufacture thereof and prior to use thereof and especially during shipment thereof.

Relatively large size threaded bolts or fasteners are usually manufactured in a number of series, each comprising a plurality of such fasteners provided with shanks having different lengths, with a fixed incremental length difference between adjacent ones of the fasteners in the series, and carrying external threads having the same major diameter. For example, socket head cap screws in the ⅝" series are usually manufactured with shank lengths of 1½", 2", 2½", 3", 3½", etc., whereby the ½" incremental length difference maintains between each two adjacent fasteners in this series. Similarly, socket head cap screws in the 1" series are usually manufactured with shank lengths of 2", 2½", 3", 3½", 4", etc., whereby the ½" incremental length difference maintains between each two adjacent fasteners in this series.

Heretofore, in the packaging for storage or shipment of each series of threaded bolts, it has been necessary to provide a corresponding series of packaging boxes or tubes; whereby the manufacturer is required to maintain a substantial inventory of these packaging boxes in the various sizes that are employed in packaging the different sizes of the threaded bolts in each series thereof. Obviously the maintenance of this inventory of the required packaging boxes is time-consuming and entirely too expensive.

Accordingly, it is a general object of the present invention to provide in combination a particular threaded bolt selected from a given series of such bolts and a broken-off section of a packaging device that may be selectively employed to package and to protect against damage the external thread carried by the shank of any one of the threaded bolts in the given series thereof, without reference to the length of the shank of the threaded bolt thus packaged.

Another object of the invention is to provide in combination a particular threaded bolt selected from a given series of such bolts and a broken-off section of a packaging device of the character described that is of elongated tubular form and that is so constructed and arranged that a packaging section thereof of required length may be readily broken from the remainder thereof in order to accommodate proper packaging of the particular threaded bolt in the given series.

A further object of the invention is to provide in combination a particular threaded bolt selected from a given series of such bolts and a broken-off section of a packaging device of the character described that is of elongated tubular form and which is so constructed and arranged that the same may be readily collapsed for storage into an elongated substantially flat-like configuration and that the same may be readily erected for use into an elongated open-ended substantially box-like configuration.

Yet another object of the invention is to provide in combination a particular threaded bolt selected from a given series of such bolts and a broken-off section of a packaging device of the character described that is simple and economical to manufacture and that is essentially formed of material that is readily available in the market at a low price.

A further object of the invention is to provide in combination a particular threaded bolt selected from a given series of such bolts and a broken-off section of a packaging device of the character described, wherein the same is formed essentially of paperboard stock.

A still further object of the invention is to provide in combination a particular threaded bolt selected from a given series of such bolts and a broken-off section of a packaging device of the character described that is of elongated tubular form and constructed essentially of paperboard and that carries upon the interior surface thereof a protective coating to prevent scuffing of fibers therefrom by the external thread carried by the shank of the packaged threaded bolt.

A still further object of the invention is to provide in combination a particular threaded bolt selected from a given series of such bolts and a broken-off section of a packaging device of the character described that is of elongated tubular form and constructed essentially of paperboard and that carries upon the external surface thereof a calendered paper sheet to accommodate the ready reception thereon of printed matter.

Further features of the invention pertain to the particular construction and arrangement of the elements of the universal packaging device, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a fragmentary plan view of a packaging device for a threaded bolt and comprising an element of the combination embodying the present invention, the packaging device being shown in its collapsed position for storage;

FIG. 2 is an end elevational view of the packaging device as shown in FIG. 1;

FIG. 3 is a fragmentary front perspective view of the packaging device, the packaging device being shown in its erected position for use;

FIG. 4 is an exploded fragmentary side elevational view of a socket head cap screw and the adjacent end of the packaging device in its erected position of FIG. 3, this view illustrating the manner in which the outer end of the shank of the cap screw is inserted into the adjacent open end of the packaging device;

FIG. 5 is a front fragmentary perspective view of the cap screw and the packaging device and comprising the combination of the present invention, and illustrating the manner in which the packaging section of the packaging device is broken-off from the remainder thereof after receiving the shank of the associated cap screw, wherein the packaging section of the packaging device has a length corresponding to that of the shank of the associated cap screw;

FIG. 6 is a greatly enlarged sectional view, taken through the wall of the packaging device in the direction of the arrows along the line 6—6 in FIG. 5; and FIG. 7 is a front perspective view illustrating a modified arrangement of the combination of the cap screw and the packaging section of the packaging device, wherein the packaging section of the packaging device has a length one incremental length longer than that of the shank of the associated cap screw.

Referring now to FIGS. 1 to 3, inclusive, of the drawings, the packaging device 10 there illustrated and adapted to be incorporated in the combination embodying the features of the present invention is especially designed to protect against damage the external thread provided on the shank of any one of a number of threaded bolts in a given series, wherein the external threads provided on the shanks of different ones of the bolts in the given series have the same major diameter, and the shanks of any adjacent two of the bolts in the given series have different lengths with a fixed incremental length difference therebetween. For the purpose of the present description, it may be assumed that the packaging device 10 is adapted for use in the packaging of the cap screws in the previously mentioned 5/8" series, and without reference to the lengths of the shanks of the packaged cap screws. Each of the cap screws in this series comprises a shank carrying an external thread having a major diameter of 5/8"; and the 1/2" incremental length difference maintains between each two adjacent cap screws in this series.

More particularly, the packaging device 10 comprises an elongated tubular body 11 that is preferably formed of paperboard stock, the body 11 having four longitudinally extending lines 12 of ruptured fibers therein that are disposed in substantially equally perimetrically spaced-apart relation so as to divide the same into four substantially identically connected panels 13, the lines 12 of ruptured fibers being arranged in the exterior surface of the body 11 and being formed in a conventional manner by scoring. Accordingly, the body 11 may be readily collapsed for storage, as shown in FIGS. 1 and 2, into an elongated substantially flat-like configuration having a width substantially equal to twice the width of one of the panels 13. Also, the body 11 may be readily erected for use, as shown in FIG 3, into an elongated open-ended substantially box-like configuration having four sides respectively formed by the four panels 13.

Each of the panels 13 has a width substantially equal to the major diameter of the external thread carried upon the shank of any one of the cap screws in the given series mentioned so that the body 11 in its erected position of FIG. 3 may be readily fitted thereover and retained in place by friction therebetween; whereby, in the present example, each of the panels 13 has a width of approximately 5/8".

Also, the body 11 has a plurality of perimetrically extending bands 14 of ruptured fibers therein that are disposed in substantially equally longitudinally spaced-apart relation so as to divide the same into a plurality of substantially identical segments 15, each of the bands 14 of ruptured fibers being arranged through the body 11 and being formed in a conventional manner by perforating or rouletting, rouletting being preferred. Accordingly, the body 11 may be readily broken along any one of the bands 14 for a purpose more fully explained hereinafter.

Each of the segments 15 has a length substantially equal to the previously mentioned fixed incremental length; whereby in the present example, each of the segments 15 has a length of approximately 1/2".

As shown in FIG. 6, the exterior surface of the body 11 that is formed of paperboard stock carries a calendered paper sheet 16 that is firmly adhered thereto by an intervening layer 17 of any suitable paste or glue; which calendered paper sheet 16 constitutes an exterior wrapper that is adapted to accommodate the ready reception thereon of printed matter, for a purpose more fully explained hereinafter. Also, the interior surface of the body 11 that is formed of paperboard stock carries a protective coating 18 that is firmly adhered thereto; which coating may be formed of a suitable resin, such, for example, as a silicone resin, and is employed for a purpose more fully explained hereinafter.

Also, for the purpose of the present description, it may be assumed that the particular socket head cap screw 20 illustrated in FIG. 4 is in the 5/8" series and then a shank length of 1 1/2". More particularly, the socket head screw 20 comprises the enlarged head 21 having the tool-receiving recess 22 therein which may be of conventional hexagonal configuratoin. Further, the socket head screw 20 comprises the elongated shank 23 having the previously mentioned length of 1 1/2" between the underface of the head 21 and the extreme outer end thereof and carrying the external thread 24 also extending to the extreme outer end thereof, the external thread 24 carried by the shank 23 having a major diameter of 5/8".

In employing the packaging device 10 to package the particular cap screw 10 illustrated in FIG. 4, the packaging device 10 is first erected to its elongated open-ended substantially box-like configuration, as shown in FIGS. 3 and 4. The extreme outer end of the cap screw 20 is then inserted into the adjacent open end of the packaging device 10 and until the extreme outer end of the adjacent segment 15 of the packaging device 10 engages the adjacent underface of the enlarged head 21 of the cap screw 20. At this time, and in these particular examples of the packaging device 10 and the cap screw 20, three of the segments 15 of the body 11 of the packaging device 10 are disposed upon the shank 23 of the cap screw 20 and the third band 14 of roulettes is disposed flush with the extreme outer end of the shank 23 of the cap screw 20, the three segments 15 of the body 11 constituting a packaging section thereof for the cap screw 20. Accordingly, at this time, the exertion of a bending force upon the extreme outer end of the body 11 of the packaging device 10 causes the packaging section of the body 11, and comprising the three segments 15 thereof, to be readily broken-off along the third band 14 of roulettes previously mentioned, in an obvious manner as illustrated in FIG. 5. More particularly, the packaging section of the body 11 of the packaging device 10 is broken off therefrom and the remainder of the body 11 is available for use in packaging other of the cap screws in the 5/8" series. It is apparent that the packaging section mentioned of the body 11 completely embraces and covers the shank 23 of the cap screw 20, thereby protecting the external thread 24 carried by the shank 23 against damage incident to storage or shipment of the cap screw 20.

As previously noted, the interior surface of the body 11 carries the previously described coating 18 that serves the useful purpose of preventing scuffing of fibers from the body 11 formed of paperboard stock by the external thread 24 carried by the shank of the cap screw 20; which arrangement not only prevents damage to the adjacent packaging section of the body 11, but also prevents objectionable filling-up of the external threads 24 with the fibers mentioned.

As previously noted, the exterior surface of the body 11 carries the previously described calendered paper sheet 16 that serves the useful purpose of providing printed information concerning the circumstance that the cap screw 20 is in the 5/8" series. Also, this calendered paper sheet 16 may carry printed matter for the usual advertising purpose, as well as that of displaying the trademark of the manufacturer of the cap screw 20.

In view of the foregoing description of the mode of the utilization of the packaging device 10 to package the particular cap screw 20 in the 5/8" series and having the shank length of 1 1/2", it will be understood that any other of the cap screws in this series may be packaged in an identical manner, without reference to the length of the shank thereof. In other words, in the packaging of any one of the cap screws in this series, the exertion of a bending force upon the body 11 after the insertion of the cap screw into the open outer end thereof causes the packaging section of the body 11 to be broken-off from the remainder thereof along the particular one of the bands 14 of roulettes positioned adjacent to the extreme outer end of the cap screw, whereby the packaging section of the body 11 mentioned comprises a corresponding plurality of the segments 15, each having the length of ½″; whereby the external thread provided on the shank of the package cap screw is protected against damage, regardless of the length of the shank of the packaged cap screw.

A slightly modified form of utilization of the packaging device 10 is illustrated in conjunction with the cap screw 20, as shown in FIG. 7; and more particularly in this arrangement, after the shank 23 of the cap screw 20 is inserted into the adjacent open end of the packaging device 10, the packaging section is broken-off to contain one additional segment 15 beyond the length of the shank 23; which additional segment 15 carried by the packaging section of the body 11 projects outwardly with respect to the extreme outer end of the shank 23 of the cap screw 20. Subsequently, this additional outer segment 15 mentioned is broken into four flaps along the lines 12 of the scoring; which flaps are inwardly folded toward each other to provide a closed outer end for the packaging section of the body 11 thus formed. The flaps mentioned may be retained in position by gluing the same together or by the utilization of an adhesive tape, or the like, in any conventional manner.

In the manufacture of the packaging device 10, a flat board 11 of the paperboard stock is provided and the inner surface of the board 11 carries the resinous coating 18 that has been previously applied thereto and properly dried. Also, the outer calendered paper sheet 16 is provided that carried the preprinted matter thereupon, as previously noted. The inner surface of the calendered paper sheet 16 is then suitably secured to the outer surface of the board 11, utilizing the intervening layer of adhesive 17; whereupon the composite board as shown in FIG. 6 is thus fabricated. This composite board is then run in flat position through a conventional scoring machine for the purpose of producing the longitudinally extending lines 12 of scoring in the outer surface of the composite board mentioned; and thereafter, this composite board is then run in flat position through a conventional rouletting machine for the purpose of producing the laterally extending bands 14 of roulettes through the composite board mentioned. In passing, it is mentioned that it is immaterial whether the scoring machine or the rouletting machine is first employed, since these conventional steps are frequently employed in either sequence mentioned. The composite board thus processed by the scoring machine and the rouletting machine comprises three full intermediate panels 13 and two outside partial panels or flaps, as best indicated in FIG. 2. The exterior surface of one of the flaps mentioned is coated with a suitable cement and this flap is arranged interiorly with respect to the other of the flaps mentioned; whereupon the two flaps mentioned are pressed together to form the fourth panel 13, all in a conventional manner, and as clearly illustrated in FIG. 2. The above described manipulations of the two flaps mentioned to form the fourth panel 13 that is identical to the other three panels 13 in the composite tubular body 11 of the packaging device 10 are, in no way, critical since these steps comprise conventional steps in the paperboard box-making art.

In view of the foregoing description of the construction and arrangement of the packaging device 10 that is especially designed for packaging the cap screws in the ⅝″ series, it will be appreciated that other such devices will be constructed for the packaging of the cap screws in the other and corresponding series ¾″, 1″, etc.; which other packaging devices will be identical to the packaging device 10 as described above, except that in each case, each of the panels has a width substantially corresponding to the major diameter of the external threads provided on the shanks of the different ones of the cap screws in the particular series and each of the segments has a length approximately equal to the fixed incremental length difference between any adjacent two of the cap screws in the particular series.

In view of the foregoing, it is apparent that there has been provided in combination a particular threaded bolt selected from a given series of such bolts and a broken-off section of a packaging device that is adapted to protect against damage the external thread provided on the shank of any one of a number of threaded bolts in the given series; which packaging device is of simple and economical construction and arrangement; whereby the inventory of such packaging devices that must be carried by a manufacturer of such threaded bolts is greatly minimized.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, a particular bolt including an elongated shank carrying an enlarged head on the rear end thereof and provided with an external thread on the front end thereof, and a particular broken-off section of a packaging device fitted over the shank of said particular bolt and retained in place by friction therebetween; wherein said particular bolt is selected from a number of such bolts in a given series, wherein the external threads provided on the shanks of the different ones of the bolts in the given series have the same major diameter and the shanks of any adjacent two of the bolts in the given series have different lengths with a fixed incremental length difference therebetween, and wherein said packaging device comprising an elongated tubular body formed of paperboard stock, said body having four longitudinally extending lines of ruptured fibers therein that are disposed in substantially equally perimetrically spaced-apart relation so as to divide the same into four substantially identical connected panels, whereby said body may be readily collapsed for storage into an elongated substantially flat-like configuration having a width substantially equal to twice the width of one of said panels, and whereby said body may be readily erected for use into an elongated open-ended substantially box-like configuration having four sides respectively formed by said four panels, each of said panels having a width approximately equal to the major diameter of the external thread carried upon the shank of any one of the bolts in the given series so that said body in its erected position may be readily fitted thereover and retained in place by friction therebetween, said body having a plurality of perimetrically extending bands of ruptured fibers therein that are disposed in substantially equally longitudinally spaced-apart relation so as to divide the same into a plurality of substantially identical connected segments, each of said segments having a length approximately equal to the previously mentioned fixed incremental length, whereby a packaging section of said body may be readily broken-off from the remainder thereof after said body in its erected position has been fitted over the external thread carried upon the shank of any one of the bolts in the given series and with the broken-off packaging section of said body having an overall length approximately equal to that of the shank of the one bolt mentioned and including a corresponding number of said segments.

2. In combination, a particular bolt including an elongated shank carrying an enlarged head on the rear end thereof and provided with an external thread on the front end thereof, and a particular broken-off section of a packaging device fitted over the shank of said particular bolt and retained in place by friction therebetween; wherein said particular bolt is selected from a number of such bolts in a given series, wherein the external threads provided on the shanks of the different ones of the bolts in the given series have the same major diameter and the shanks of any adjacent two of the bolts in the given series have different lengths with a fixed incremental length difference therebetween, and wherein said packaging device comprising an elongated tubular body formed of paperboard stock, said body having four longitudinally extending lines of scoring therein that are disposed in substantially equally perimetrically spaced-apart relation so as to divide the same into four substantially identical connected panels, whereby said body may be readily collapsed for storage into an elongated substantially flat-like configuration having a width substantially equal to twice the width of one of said panels, and whereby said body may be readily erected for use into an elongated open-ended substantially box-like configuration having four sides respectively formed by said four panels, each of said panels having a width approximately equal to the major diameter of the external thread carried upon the shank of any one of the bolts in the given series so that said body in its erected position may be readily fitted thereover and retained in place by friction therebetween, said body having a plurality of perimetrically extending bands of roulettes therein that are disposed in substantially equally longitudinally spaced-apart relation so as to divide the same into a plurality of substantially identical connected segments, each of said segments having a length approximately equal to the previously mentioned fixed incremental length, whereby a packaging section of said body may be readily broken-off from the remainder thereof after said body in its erected position has been fitted over the external thread carried upon the shank of any one of the bolts in the given series and with the broken-off packaging section of said body having an overall length approximately equal to that of the shank of the one bolt mentioned and including a corresponding number of said segments.

3. The combination set forth in claim 1, wherein said packaging device further comprising a calendered paper sheet firmly adhered to the exterior surface of said body to accommodate the ready reception thereon of printed matter.

4. The combination set forth in claim 1, wherein said packaging device further comprising a protective coating firmly adhered to the interior surface of said body to prevent scuffing of fibers therefrom by the external thread carried by the shank of any one of the bolts in the given series over which said body is frictionally fitted.

References Cited by the Examiner
UNITED STATES PATENTS

| | | | |
|---|---|---|---|
| 192,883 | 7/87 | Swift | 229—51 |
| 1,627,811 | 5/27 | Smith. | |
| 1,999,909 | 4/35 | Lupton | 229—51 |
| 2,057,122 | 10/36 | Trevellyan | 229—51 X |
| 2,205,437 | 6/40 | Ringler | 229—51 |
| 2,371,913 | 3/45 | Phillips et al. | 138—96 |
| 2,477,787 | 8/49 | Cook. | |
| 2,554,662 | 5/51 | Cowgill. | |
| 2,930,408 | 3/60 | Stevens | 229—51 |

GEORGE O. RALSTON, *Primary Examiner.*